US011372945B2

United States Patent
Horiuchi et al.

(10) Patent No.: US 11,372,945 B2
(45) Date of Patent: Jun. 28, 2022

(54) RESTRUCTURING PAGES HAVING SIMILAR CONTENT

(71) Applicant: INTERNATIONAL BUSINESS MACHINES CORPORATION, Armonk, NY (US)

(72) Inventors: Yoshio Horiuchi, Hiratsuka (JP); Tomoko Murayama, Yokohama (JP); Masaki Saitoh, Yokohama (JP); Tsend Ochir Bat Ulzii, Tokyo (JP); Masayuki Yamana, Yokomaha (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/712,549

(22) Filed: Sep. 22, 2017

(65) Prior Publication Data
US 2019/0095543 A1    Mar. 28, 2019

(51) Int. Cl.
G06F 17/00 (2019.01)
G06F 16/957 (2019.01)
G06F 3/0483 (2013.01)
G06F 16/954 (2019.01)

(52) U.S. Cl.
CPC .......... *G06F 16/957* (2019.01); *G06F 3/0483* (2013.01); *G06F 16/954* (2019.01)

(58) Field of Classification Search
CPC ............. G06F 17/30489; G06F 3/0641; G06F 16/957; G06F 16/954; G06F 3/0483
See application file for complete search history.

(56) References Cited

U.S. PATENT DOCUMENTS

| 7,461,334 | B1* | 12/2008 | Lu .......................... G06Q 30/06 715/234 |
| 7,526,470 | B1* | 4/2009 | Karnawat ........... G06F 16/9535 |
| 7,673,233 | B2 | 3/2010 | Moore et al. |
| 7,734,627 | B1 | 6/2010 | Tong |
| 2004/0093562 | A1* | 5/2004 | Diorio ............... G06F 17/30873 715/205 |
| 2008/0177994 | A1* | 7/2008 | Mayer ................... G06F 9/4418 713/2 |
| 2008/0301562 | A1* | 12/2008 | Berger .................. G06F 16/958 715/733 |
| 2009/0276467 | A1* | 11/2009 | Scholtes ................. G06F 16/30 |
| 2009/0327947 | A1* | 12/2009 | Schreiner .............. G06F 3/0483 715/777 |
| 2012/0331408 | A1 | 12/2012 | Ainslie et al. |

(Continued)

FOREIGN PATENT DOCUMENTS

WO    2016208916 A1    12/2016

OTHER PUBLICATIONS

Techopedia, "What is URL Redirect," copyright 2011, www.techopedia.com, https://web.archive.org/web/20111113204552/https://www.techopedia.com/definition/1708/url-redirect, p. 1. (Year: 2011).*

(Continued)

*Primary Examiner* — Andrew T McIntosh
(74) *Attorney, Agent, or Firm* — Rakesh Roy

(57) ABSTRACT

A computer-implemented method includes: selecting a web page from plural web pages being opened in a web browser; finding a similar page having similar content to the selected web page from the plural web pages; and closing the similar page in response to an operation by a user.

15 Claims, 15 Drawing Sheets

(56) References Cited

U.S. PATENT DOCUMENTS

| | | | |
|---|---|---|---|
| 2013/0191764 A1* | 7/2013 | Ferreira | G06F 3/0481 715/760 |
| 2015/0205462 A1* | 7/2015 | Jitkoff | G06F 16/955 715/777 |
| 2017/0075528 A1 | 3/2017 | Kothari et al. | |
| 2017/0091546 A1* | 3/2017 | Shigeeda | G06K 9/00463 |
| 2018/0025084 A1* | 1/2018 | Conlan | G06F 16/955 707/734 |
| 2018/0113583 A1* | 4/2018 | Jain | G06F 16/957 |

OTHER PUBLICATIONS

Wikihow, "5 Ways to Close Windows," copyright 2013, www.wikihow.com, https://web.archive.org/web/20131209093046/https://www.wikihow.com/Close-Windows, p. 1-4. (Year: 2013).*

Liu et al., WildThumb: Web Browser Supporting Efficient Task Management on Wide Displays, ACM, 2010, pp. 159-168 (Year: 2010).*

Google, "Duplicate Content", Printed on Sep. 21, 2017, 3 Pages, http://support.google.com/webmasters/answers/66359.

IBM, "AlchemyLanguage", IBM Watson Developer Cloud, Printed on Sep. 21, 2017, 3 Pages, https://www.ibm.com/watson/developercloud/alchemy-language.html.

Visibotech, "Too Many Tabs for Chrome", Visibo Limited, Printed on Sep. 21, 2017, Copyright 2008, 5 Pages, http://www.visibotech.com/TMTChrome.

OneTab, "OneTab, Save up to 95% memory and reduce tab clutter in Google Chrome", Printed on Sep. 21, 2017, 1 Page, https://www.one-tab.com/.

Visibotech, "Too Many Tabs for Chrome", Visibo Limited, Printed on May 25, 2017, Copyright 2008, 5 Pages, http://vww.visibotech.com/TMTChrome.

OneTab, "OneTab", Printed on May 25, 2017, 1 Page, https://www.one-tab.com/.

* cited by examiner

RESTRUCTURING PAGES HAVING SIMILAR CONTENT

BACKGROUND

The present invention relates generally to web browsers, and more particularly to restructuring web pages having similar content.

Currently, many computers apply a window system. In the window system, users can do multiple tasks simultaneously while maintaining multiple pages on a display and switching the pages using an input device such as a mouse or a keyboard. To simplify page control, a tabbed document interface (TDI) application may be used. This application collectively controls multiple pages with tabs under a single window.

SUMMARY

According to an embodiment of the present invention, there is provided a computer-implemented method. The method includes selecting a web page from plural web pages being opened in a web browser. The method further includes finding a similar page having similar content to the selected web page from the plural web pages. The method further includes closing the similar page in response to an operation by a user.

According to another embodiment of the present invention, there is provided a computer program product comprising a computer readable storage medium having program instructions stored on or embodied therewith. The program instructions executable by a computer to cause the computer to select a web page from plural web pages being opened in a web browser. The program instructions are executable by a computer to cause the computer to find a similar page having similar content to the selected web page from the plural web pages. The program instructions are executable by a computer to cause the computer to close the similar page in response to an operation by a user.

According to another embodiment of the present invention, there is provided a computer system comprising one or more computer processors, one or more computer-readable storage media, and program instructions stored on one or more of the computer-readable storage media for execution by at least one of the one or more computer processors. The program instructions executable by the computer system to cause the computer to select a web page from plural web pages being opened in a web browser. The program instructions are executable by the computer system to cause the computer system to find a similar page having similar content to the selected web page from the plural web pages. The program instructions are executable by the computer system to cause the computer system to close the similar page in response to an operation by a user.

BRIEF DESCRIPTION OF THE DRAWINGS

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the present invention are disclosed herein for purposes of describing and illustrating claimed structures and methods that may be embodied in various forms, and are not intended to be exhaustive in any way, or limited to the disclosed embodiments. Many modifications and variations will be apparent to those of ordinary skill in the art without departing from the scope and spirit of the disclosed embodiments. The terminology used herein was chosen to best explain the principles of the one or more embodiments, practical applications, or technical improvements over current technologies, or to enable those of ordinary skill in the art to understand the embodiments disclosed herein. As described, details of well-known features and techniques may be omitted to avoid unnecessarily obscuring the embodiments of the present invention.

References in the specification to "one embodiment", "an embodiment", "an example embodiment", or the like, indicate that the embodiment described may include one or more particular features, structures, or characteristics, but it shall be understood that such particular features, structures, or characteristics may or may not be common to each and every disclosed embodiment of the present invention herein. Moreover, such phrases do not necessarily refer to any one particular embodiment per se. As such, when one or more particular features, structures, or characteristics is described in connection with an embodiment, it is submitted that it is within the knowledge of those skilled in the art to affect such one or more features, structures, or characteristics in connection with other embodiments, where applicable, whether or not explicitly described.

Figure 1A:
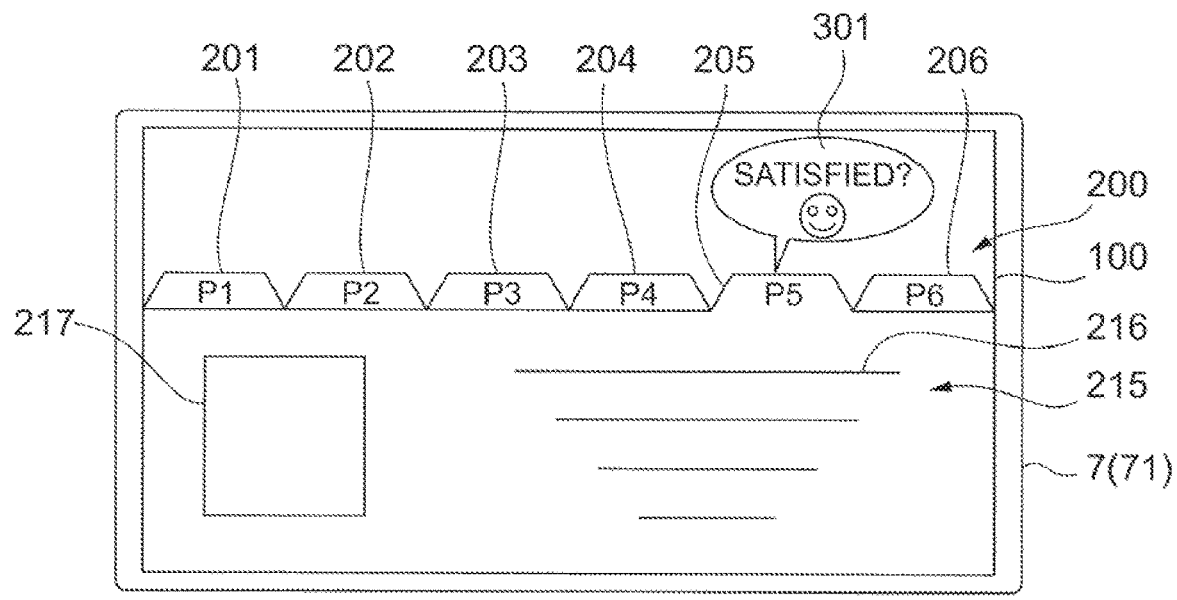
FIG. 1A depicts an application window displayed on a display according to an exemplary embodiment.
Figure 1B:
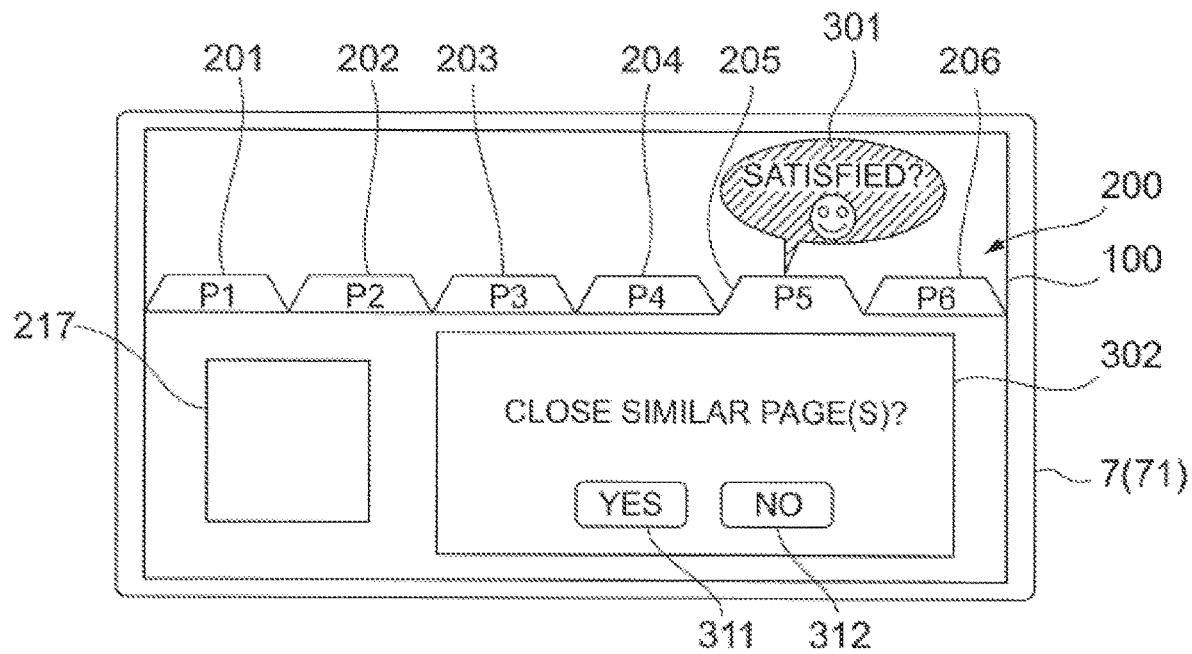
FIG. 1B depicts the application window after selecting a Satisfied button according to an exemplary embodiment.
Figure 1C:
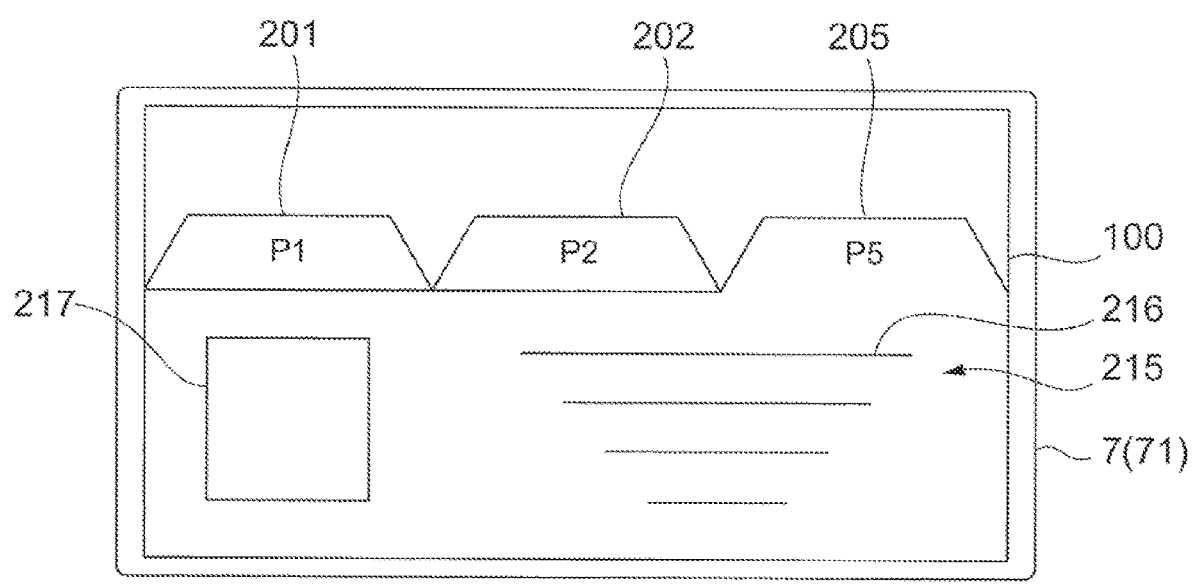
FIG. 1C depicts the application window after closing similar pages according to an exemplary embodiment.

FIG. 1A depicts an application window 100 displayed on a display 7 according to an exemplary embodiment. FIG. 1B depicts the application window 100 after selecting a Satisfied button 301. FIG. 1C depicts the application window 100 after closing similar pages.

As shown in FIG. 1A, the application window 100 is displayed in a presentation space (display area) 71 on a display 7 (described later). The application window 100 may include multiple pages. In the example shown in the figure, the application window 100 includes six pages respectively tabbed with the first tab 201 to the sixth tab 206. The first tab 201 to the sixth tab 206 (hereinafter may be referred to as "tabs 200") each include a text for identifying the corresponding page. For example, the fifth tab 205 includes a title of a fifth page 215, namely "P5." Using the tabs 200, the user can visit the pages at any time because the pages are kept open under the respective tabs.

In this exemplary embodiment, the application displaying the application window 100 is a web browser. The pages displayed in the application window 100 are web pages. In the example shown in the figure, the fifth page 215 tabbed with the fifth tab 205 is a new page to be opened, and includes a text 216 and a picture 217. The fifth page 215 is an example of the claimed selected web page.

Each of the tabs 200 is associated with each page. If a new page is opened, a new tab appears in the application window 100 with the new page. If a displayed page is closed, the tab tabbed to the displayed page disappears with the displayed page. Further, selecting one of the tabs 200 switches the page displayed in the application window 100. For example, if the sixth tab 206 is selected in FIG. 1A, a page tabbed with the sixth tab 206 appears in the application window 100, coming to a top layer of the presentation space 71. This causes the fifth page 215 to be hidden. Although the fifth page 215 is not displayed, i.e. invisible in the application window 100, the fifth page 215 is kept open in the web browser.

This exemplary embodiment assumes that a user searches for a specific page having specific information. Here, if the user opens many pages, in other words, if the number of the tabs 200 in the application window 100 increases, the size of each of the tabs 200 becomes small so that the space for the text such as the title becomes limited. Also, accessibility to each of the tabs 200 may be decreased. For example, it may take a longer time for the user to find a particular tab.

To improve accessibility to the tabs 200, this exemplary embodiment displays another UI component, i.e. a Satisfied button 301 in the presentation space 71, as shown in FIG. 1A. The Satisfied button 301 enables the user to restructure the tabs 200. In other words, the user can start a process to organize the pages by selecting the Satisfied button 301. The Satisfied button 301 is an example of the claimed user interface component.

The Satisfied button 301 is associated with the fifth tab 205 in FIG. 1A. In other words, the Satisfied button 301 corresponds to the fifth page 215 which is currently displayed in the application window 100. In FIG. 1A, the Satisfied button 301 of a balloon shape is displayed over the fifth tab 205. Note that if another page, e.g. the sixth page is displayed in the application window 100, the Satisfied button 301 is displayed over the sixth tab 206. In other words, the Satisfied button 301 is shifted to a currently displayed page. The Satisfied button 301 is visually different from the tabs 200. This enables the user to find the Satisfied button 301 easily.

The Satisfied button 301 shows information for asking the user whether the corresponding page satisfies the user. More specifically, the Satisfied button 301 asks the user whether the corresponding page, e.g. the fifth page 215 has the specific information the user has been searching for. In the present exemplary embodiment, the Satisfied button 301 includes a text "SATISFIED?" and a figure of a smile face representing the user's satisfaction.

The Satisfied button 301 has a function to start a process to close similar page(s). More specifically, if the user points, e.g. clicks on the Satisfied button 301, the similar page(s) are closed in response to the click. Note that the similar page is a page which has similar content to the page that satisfies the user. The click is an example of the claimed operation by a user.

In the present exemplary embodiment, the fifth page 215 is the satisfying page. A page tabbed with the third tab 203 (the third page), a page tabbed with the fourth tab 204 (the fourth page), and a page tabbed with the sixth tab 206 (the sixth page) are similar pages to the satisfying page (the fifth page). Note that a page tabbed with the first tab 201 (the first page) and a page tabbed with the second tab 202 (the second page) are dissimilar pages. Similar pages and dissimilar pages may be determined by analyzing the content of each page (described later).

Here, if the user clicks the Satisfied button 301, the color of the Satisfied button 301 changes and a confirmation window 302 is displayed, as shown in FIG. 1B. The confirmation window 302 prompts the user whether to close the similar page(s). In the present exemplary embodiment, the confirmation window 302 includes a text such as "CLOSE SIMILAR PAGE(S)?", a Yes button 311, and a No button 312. The Yes button 311 and the No button 312 receive an input from the user. The confirmation window 302 is an example of the claimed confirmation component.

If the user clicks the Yes button 311, the similar pages are closed. In the present exemplary embodiment, the similar pages, i.e. the third page, the fourth page, and the sixth page 216 are closed as shown in FIG. 1C. The dissimilar pages, i.e. the first page and the second page remain with the fifth page 215. In other words, this exemplary embodiment closes a part of the pages opened in the application window 100, so that this exemplary embodiment does not uniformly handle the pages opened in the application window 100, i.e. all pieces of content.

Note that the area of the tabs 200 of remaining pages increases after closing the similar pages. More specifically, the width of the remaining tabs, i.e. the first tab 201, the second tab 202, and the fifth tab 205, increases.

This enables the remaining tabs to show more information on the corresponding pages. Additionally, the accessibility to the remaining tabs may be increased. Note that the present exemplary embodiment prevents mushrooming of the tabs 200 by taking into account the content of the pages, i.e. relevance between pieces of the content of the pages so as to effectively restructure the tabs 200. To achieve this, the present exemplary embodiment analyzes the content of the pages and proposes restructuring of the tabs 200 to the user. The present exemplary embodiment proposes schemes for such effective tab restructuring. Advantageously, the tab restructuring according to embodiments of the present disclosure enables better utilization of computing resources, thereby improving computing performance, by eliminating redundant use of the computing resources in supporting the display of duplicate tabs in a web browser. Further, the tab restructuring improves user experience and use of a web browser by a user by automatically reducing redundant clutter, formed by duplicate tabs, and the like, in the web browser.

To open the new page is an example of selecting a web page from a plurality of web pages being opened in the web browser.

Note that the application displaying the application window 100 is not limited to the web browser; the application may be any application, such as a document creation application, a spread sheet application, a database application, or a presentation application. The content within the pages may be any content such as an e-mail, a document, a spread sheet, a slide, a memo, or an address book. The tabs 200 are examples of a user interface (UI) component. The UI component may refer to an area to receive an input from the user to open (display) or close a corresponding page.

Figure 2:
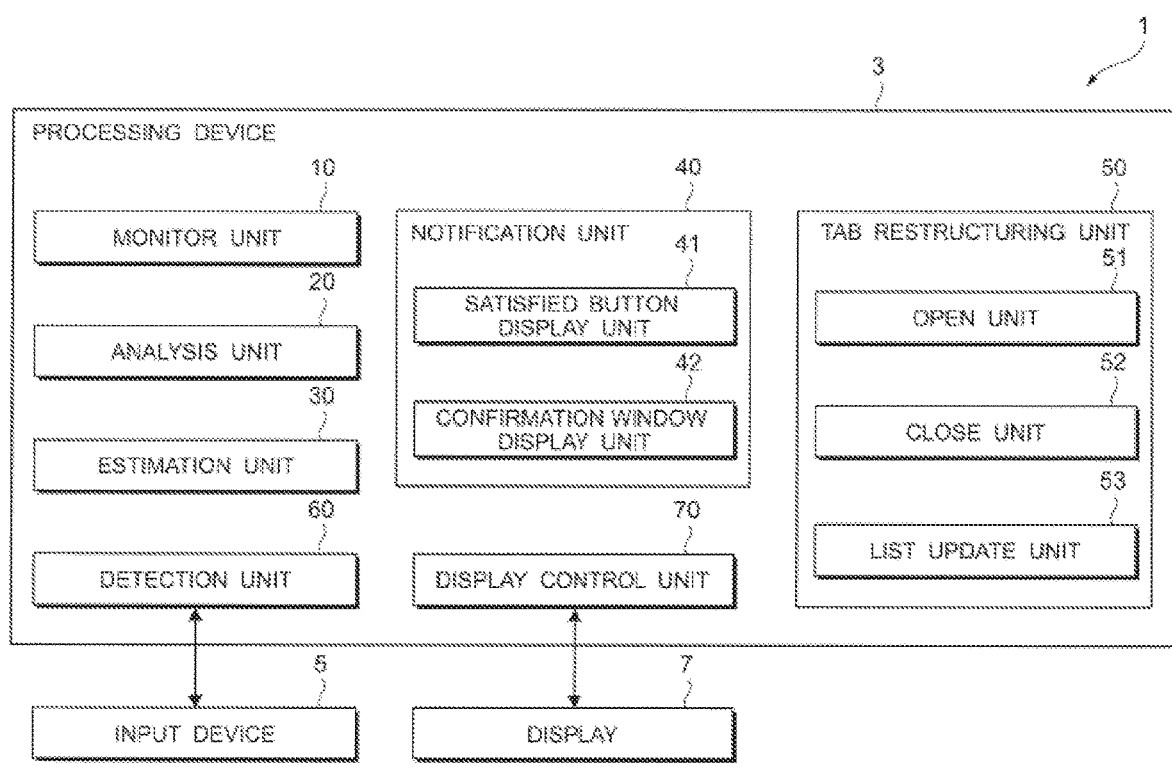
FIG. 2 depicts a block diagram of the computer system according to the exemplary embodiment of the present invention.

FIG. 2 depicts a block diagram of the computer system 1 according to the exemplary embodiment of the present invention. As shown in FIG. 2, the computer system 1 may include a processing device 3, an input device 5, and a display 7.

The processing device 3 may include a monitor unit 10, an analysis unit 20, an estimation unit 30, a notification unit 40, a tab restructuring unit 50, a detection unit 60, and a display control unit 70.

The monitor unit 10 monitors the access status. Note that the access status is a status of access by the user to the pages opened in the application window 100 (hereinafter refer to as "opened pages"). More specifically, the monitor unit 10 monitors a visit time (the date and time), a stay time (an elapsed time), and a visit frequency of the pages.

The analysis unit 20 analyzes the content of the pages to identify relationships between the pages using natural language processing. In other words, the analysis unit 20 conducts a semantic analysis to estimate a concept of the content of the pages. More specifically, the analysis unit 20 analyzes the pages to identify a page that has content similar to one of the other opened pages. Also, the analysis unit 20 analyzes whether the content of the page overlaps with that of one of the other opened pages.

The estimation unit 30 estimates a similarity of the opened pages. In other words, the estimation unit 30 determines the similar page(s) based on the attribute of the opened pages. The attribute of the opened pages may be the above content of the page. As another example, the attribute may be a text included in the page, the timing of opening the page, a URL directory of the page, a position of a tab tabbed with the page in the application window 100, or a combination thereof. Note that the pages are estimated to be viewed for the same purpose if their opening timings are close to each other. The pages viewed for the same purpose are estimated as the similar pages. In the present exemplary embodiment, the estimation unit 30 estimates the similarity of the content based on monitored data acquired by the monitor unit 10 and an analysis result by the analysis unit 20. Advantageously, the estimation of similarity of the content by the estimation unit 30, and the analysis result by the analysis unit 20, enable more efficient operation of the computer system 1, by preventing redundant display of tabs.

The notification unit 40 notifies the user that a process for restructuring the tabs 200 is executable. In the present exemplary embodiment, the notification unit 40 may include a Satisfied button display unit 41 and a confirmation window display unit 42. The Satisfied button display unit 41 displays and hides the Satisfied button 301 (refer to FIG. 1A) over the tab of the page currently displayed in the application window 100. The confirmation window display unit 42 displays and hides the confirmation window 302 in the application window 100.

The tab restructuring unit 50 controls the tabs 200 shown in the application window 100. In the present exemplary embodiment, the tab restructuring unit 50 may include an open unit 51, a close unit 52, and a list update unit 53.

The open unit 51 opens a new page. Further, the open unit 51 may display, i.e. re-use one of the opened pages if the analysis unit 20 identifies the new page as having content overlapping with the one of the opened pages. In other words, the open unit 51 may redirect the user to the one of the opened pages, instead of opening the new page. This enables to prevent an increase of overlapping pages, i.e. overlapping tabs.

The close unit 52 closes the opened pages. Further, the close unit 52 closes the similar pages in the process for restructuring the tabs 200. The page(s) to be closed in the process for restructuring the tabs 200 is determined by the estimation unit 30 using a similar page list (described later).

The list update unit 53 stores and updates a current page list and the similar page list. Note that the current page list is a list of the opened pages, i.e. pages currently opened in the application window 100. The similar page list is a list of the similar pages determined by the estimation unit 30. More specifically, the similar page list includes information on groups of the pages being similar to each other. The similar page list may be a part of the current page list.

The detection unit 60 detects an event, i.e. receives an input from the input device 5 such as a mouse or a keyboard, and outputs the input data to other units, e.g. the notification unit 40 and the tab restructuring unit 50. More specifically, the detection unit 60 detects an input from the user via the Satisfied button 301 and the confirmation window 302.

The display control unit 70 controls the display 7. The display control unit 70 further communicates with other units, e.g. the notification unit 40 and the tab restructuring unit 50.

The computer system 1 is an example of the claimed device. The open unit 51 is an example of the claimed selection unit.

Figure 3:
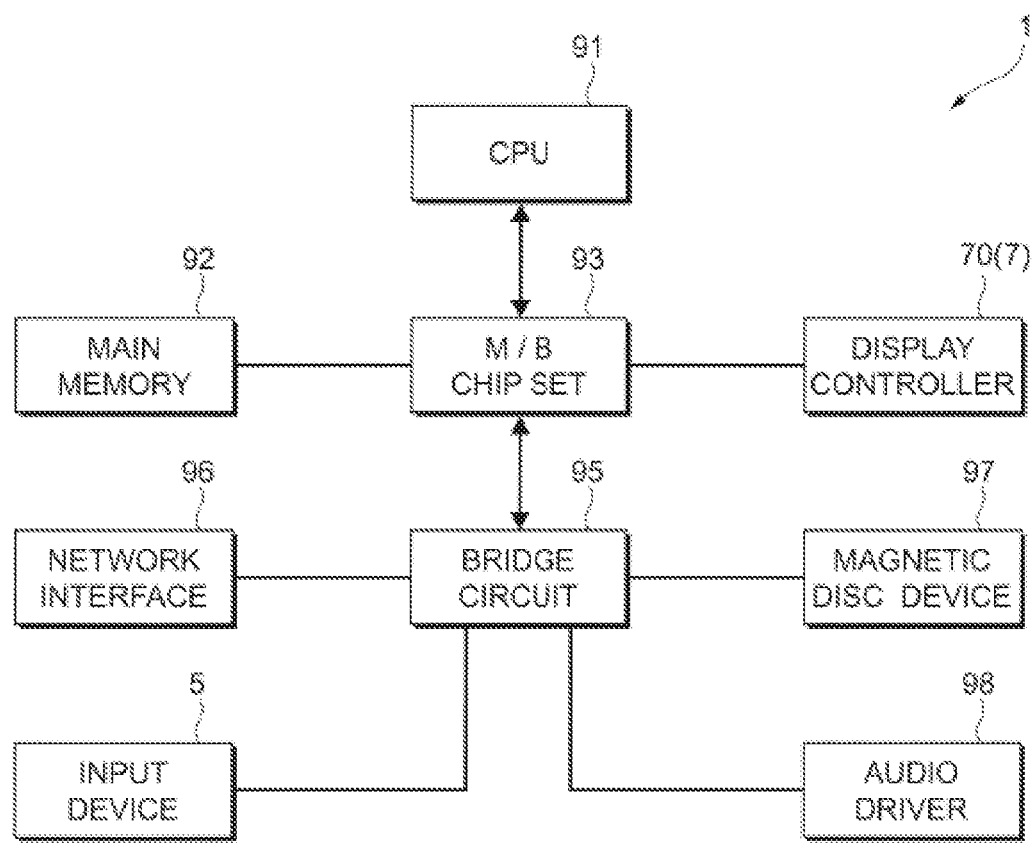
FIG. 3 depicts an example of a hardware configuration of the computer system able to implement this exemplary embodiment.

FIG. 3 depicts an example of a hardware configuration of the computer system 1 able to implement this exemplary embodiment. As shown in FIG. 3, the computer system 1 may include a central processing unit (CPU) 91, a main memory 92 connected to the CPU 91 via a motherboard (M/B) chip set 93 and serving as one example of a memory, and the display controller 70 connected to the CPU 91 via the same M/B chip set 93. A network interface 96, a magnetic disk device (HDD) 97, an audio driver 98, and the input device 5 are also connected to the M/B chip set 93 via a bridge circuit 95.

Figure 4:
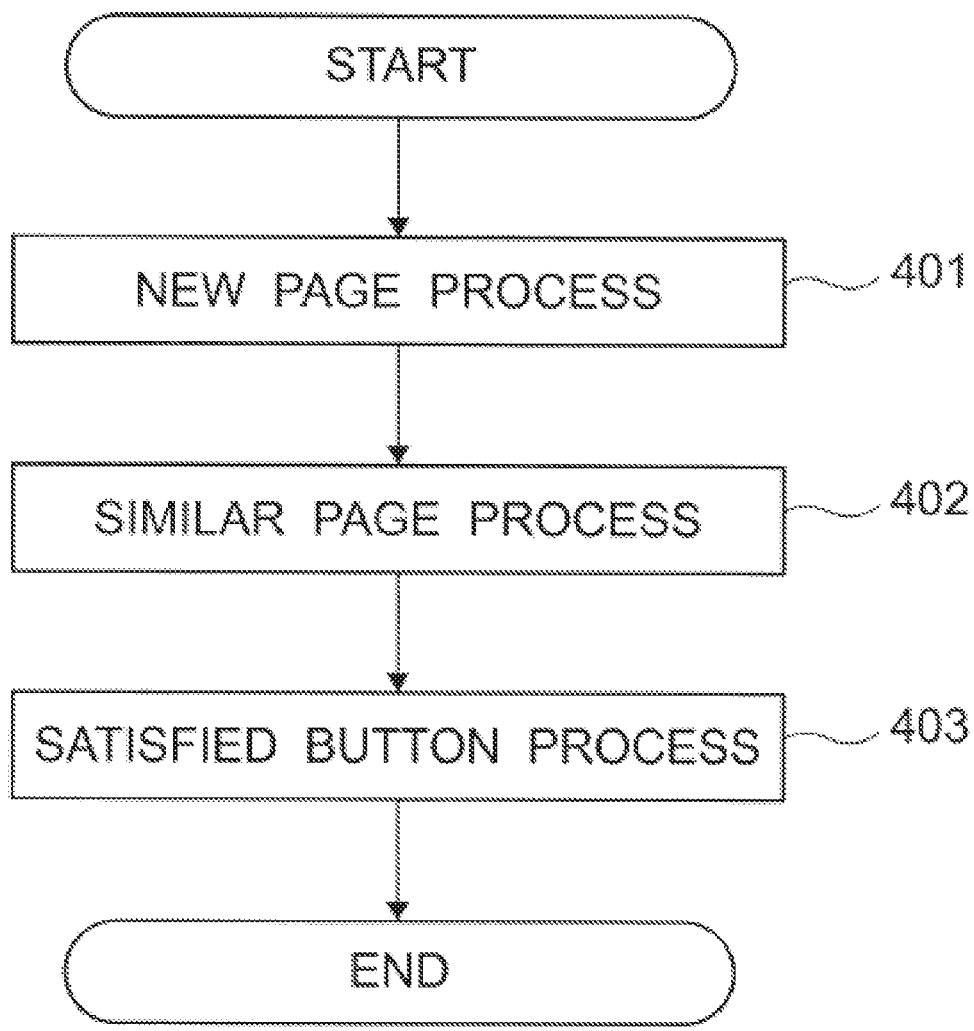
FIG. 4 is a flowchart of an operation of the computer system according to the exemplary embodiment.

FIG. 4 is a flowchart of an operation of the computer system 1 according to the exemplary embodiment. Referring to FIGS. 1A to 1C and 4, the operation of the computer system 1 will be explained. The flowchart assumes that the pages have been opened in the application window 100 in an initial state, and a new page, i.e. the fifth page 215 is newly opened (refer to FIG. 1A).

The computer system 1 first performs a new page process (step 401). The new page process is a process to open (add) the new page in the application window 100.

The computer system 1 then performs a similar page process (step 402). The similar page process is a process to update the similar page list to identify (classify) the similar page(s).

The computer system 1 then performs a Satisfied button process (step 403). The Satisfied button process is a process to restructure the tabs 200.

Figure 5:
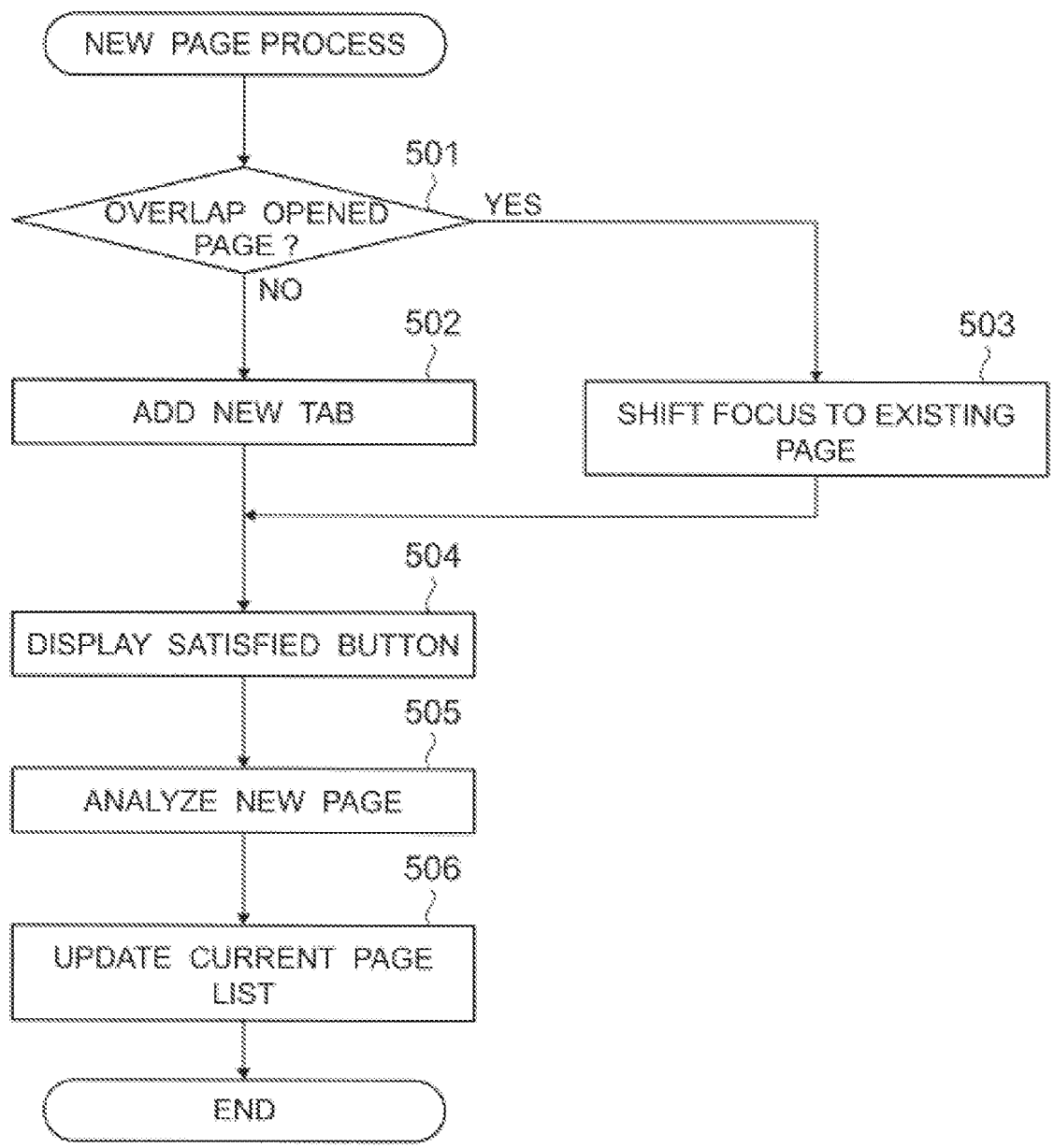
FIG. 5 is a flowchart of the new page process according to the exemplary embodiment.

FIG. 5 is a flowchart of the new page process according to the exemplary embodiment. Referring to FIG. 5, the new page process of the computer system 1 will be explained.

As shown in FIG. 5, the analysis unit 20 determines whether the content of the new page overlaps with at least one of the opened pages (step 501). If the content of the new page does not overlap with any of the opened pages (No in step 501), the open unit 51 of the restructuring unit 50 opens the new page and adds a new tab, i.e. the fifth tab 205 to the tabs 200 (step 502). If the content of the new page overlaps with one of the opened pages (Yes in step 501), the open unit 51 of the restructuring unit 50 displays (shifts focus to) the one page having the overlapping content, i.e. an existing page (step 503).

The Satisfied button display unit 41 of the notification unit 40 then displays the Satisfied button 301 (step 504). The analysis unit 20 then analyzes the content of the new page (step 505). The list update unit 53 of the tab restructuring unit 50 then updates the current page list (step 506). For example, the list update unit 53 adds information on the new page to the current page list.

Figure 6:
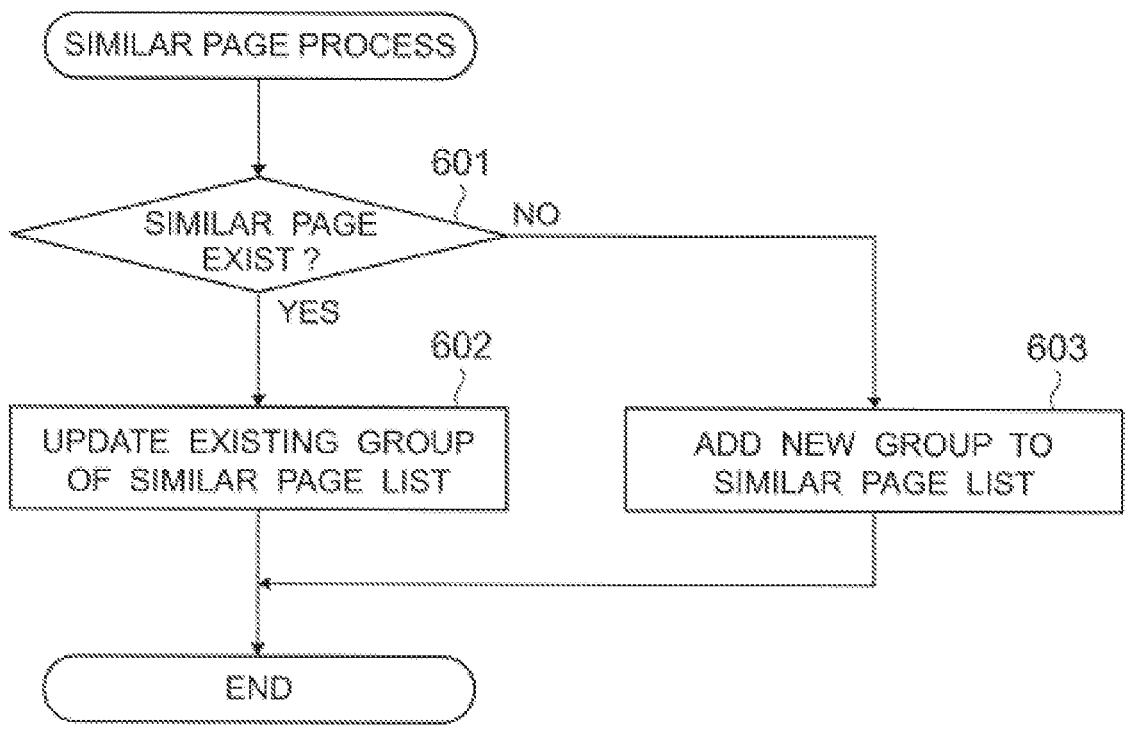
FIG. 6 is a flowchart of the similar page process according to the exemplary embodiment.

FIG. 6 is a flowchart of the similar page process according to the exemplary embodiment. Referring to FIG. 6, the similar page process of the computer system 1 will be explained.

As shown in FIG. 6, the estimation unit 30 determines whether a similar page to the new page exists in the opened pages (step 601). If the similar page exists in the opened pages (Yes in step 601), the list update unit 53 of the tab restructuring unit 50 updates the exiting group of the similar page list (step 602). In other words, the list update unit 53 adds information on the new page to the corresponding group in the similar page list. If the similar page does not exist in the opened pages (No in step 601), the list update unit 53 adds a new group including the new page to the similar page list (step 603).

Figure 7:
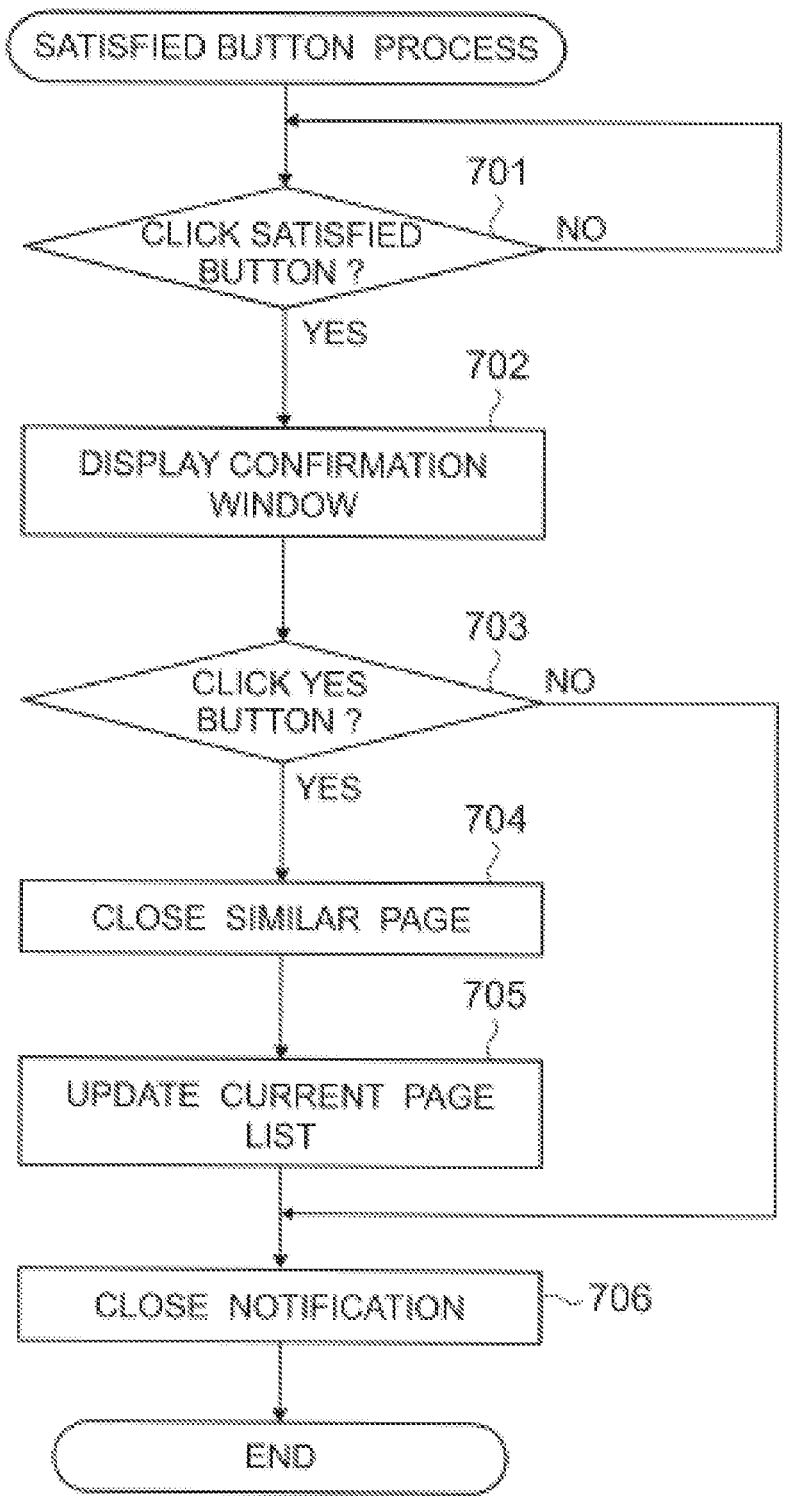
FIG. 7 is a flowchart of the Satisfied button process according to the exemplary embodiment.

FIG. 7 is a flowchart of the Satisfied button process according to the exemplary embodiment. Referring to FIG. 7, the Satisfied button process of the computer system 1 will be explained.

As shown in FIG. 7, the detection unit 60 determines whether the Satisfied button 301 is clicked by the user (step 701). If the Satisfied button 301 is clicked (Yes in step 701), the confirmation window unit 42 of the notification unit 40 displays the confirmation window 302 (step 702). The detection unit 60 then determines whether the Yes button 311 is clicked by the user (step 703).

If the Yes button 311 is clicked (Yes in step 703), the close unit 52 of the tab restructuring unit 50 closes the similar pages based on the similar page list (step 704). The list update unit 53 of the tab restructuring unit 50 then updates the current page list (step 705). The notification unit 40 then closes the notification (step 706). More specifically, the Satisfied button display unit 41 hides the Satisfied button 301 and the confirmation window unit 42 closes the confirmation window 302.

If the Yes button 311 is not clicked (No in step 703), in other words, if the No button 312 is clicked, the notification unit 40 closes the notification (step 706).

Hereinafter, alternative embodiments will be explained by referring to FIGS. 8A to 8C, 9A to 9C, 10A to 10C, and 11. In these figures, the same elements as those of the exemplary embodiment, as shown in FIGS. 1A to 1C are denoted by the same reference numerals, and the detailed explanation thereof will be omitted.

Figure 8A:
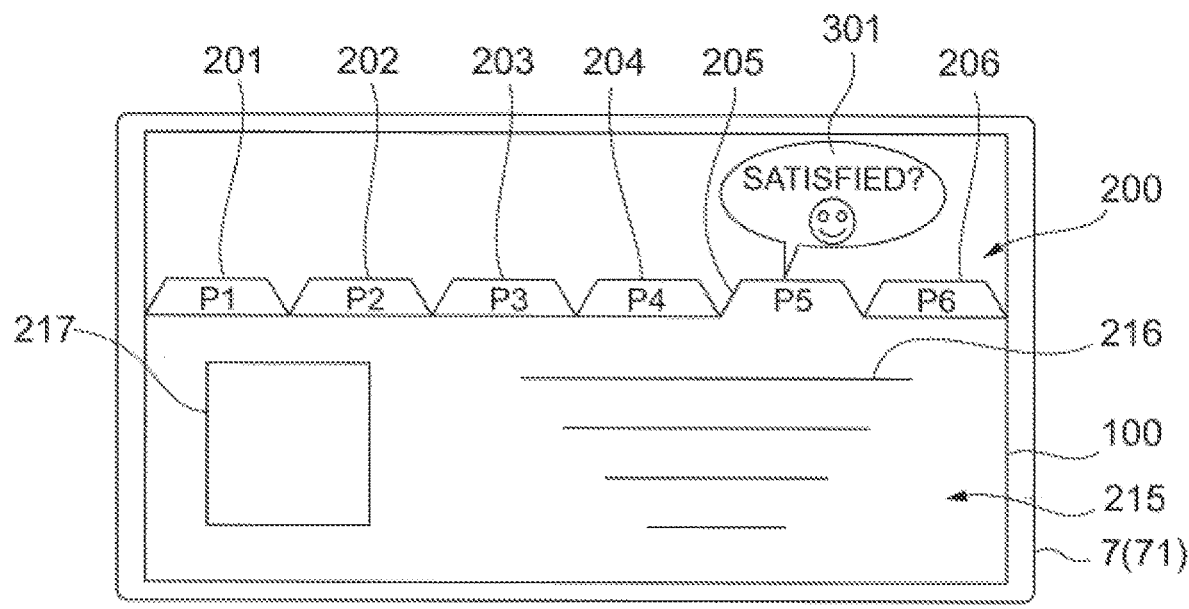
FIG. 8A depicts the application window displayed on the display according to an alternative embodiment.
Figure 8B:
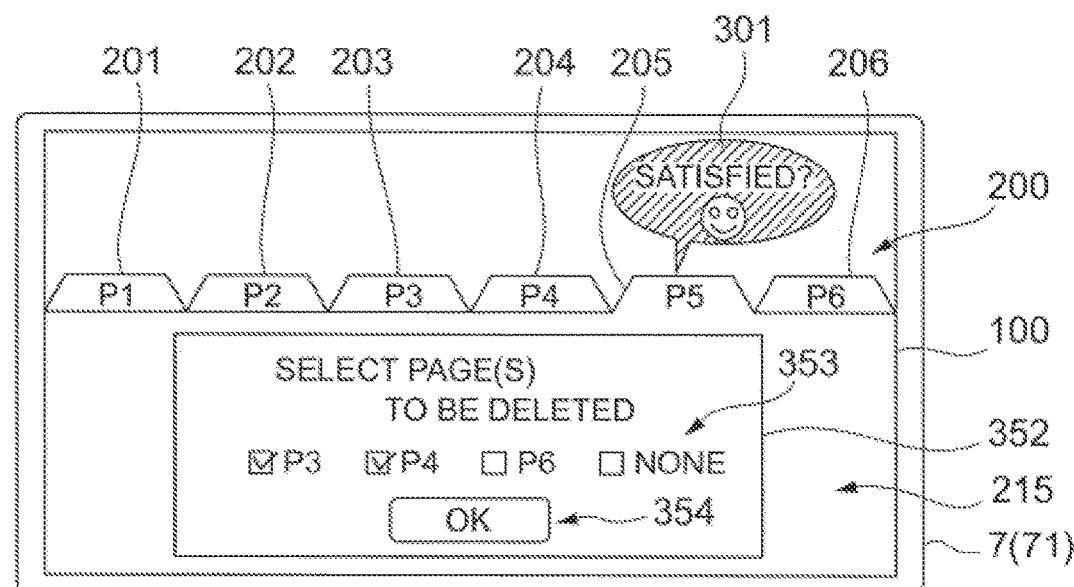
FIG. 8B depicts the application window after selecting the Satisfied button according to an alternative embodiment.
Figure 8C:
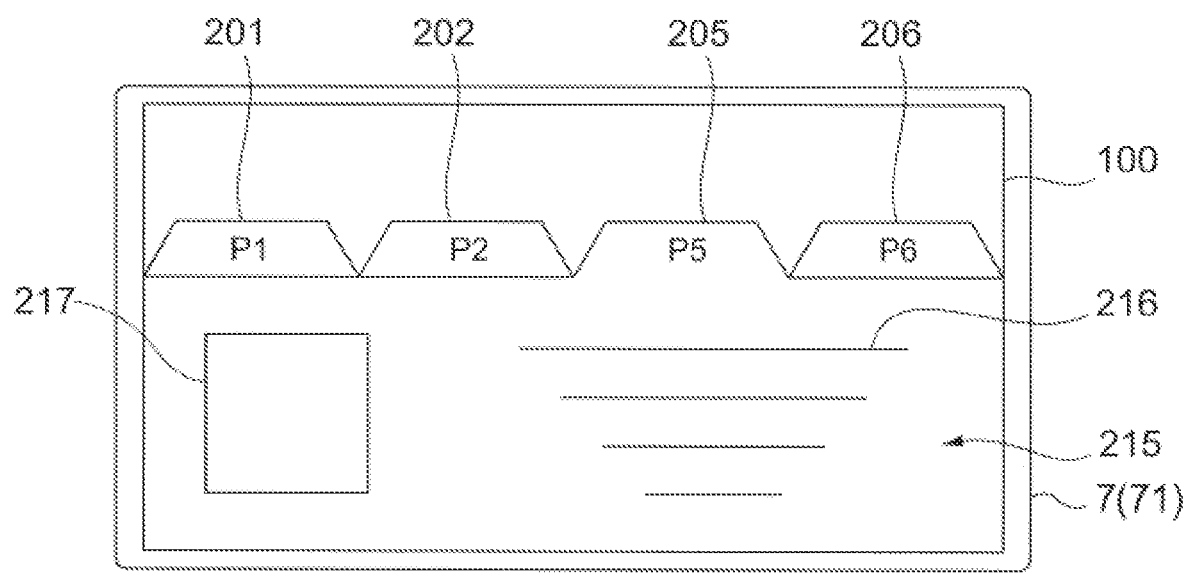
FIG. 8C depicts the application window after closing similar pages according to an alternative embodiment.

FIG. 8A depicts the application window 100 displayed on the display 7 according to a first alternative embodiment. FIG. 8B depicts the application window 100 after selecting the Satisfied button 301. FIG. 8C depicts the application window 100 after closing similar pages.

The first alternative embodiment assumes that the third page, the fourth page, and the sixth page are similar pages to the fifth page 215. In other words, the third to the sixth pages are in the same group in the similar page list.

In the first alternative embodiment, as shown in FIGS. 8A to 8C, the user can select pages to be closed after selecting the Satisfied button 301.

The first alternative embodiment firstly displays the Satisfied button 301 over the fifth tab 205 as shown in FIG. 8A. If the user clicks the Satisfied button 301, the color of the Satisfied button 301 changes and a page selection window 352 is displayed as shown in FIG. 8B. The page selection window 352 prompts the user to select page(s) to be closed. In the first alternative embodiment, the page selection window 352 includes a text "SELECT PAGE(S) TO BE DELETED", selection boxes 353, and an OK button 354. The selection boxes 353 are check boxes to receive an input from the user. More specifically, using the selection boxes 353, the user can select the pages to be closed (deleted). The OK button 354 is a button to start a process to close the selected page(s). The page selection window 352 is an example of the claimed page selecting component.

In FIG. 8B, the check boxes "P3", "P4", "P6", and "None" are displayed. The boxes "P3", "P4", "P6" respectively correspond to the third, the fourth, and the sixth pages. The pages shown in the selection boxes 353 are determined based on the group in the similar page list. The check box "None" represents that the user does not want to close any page. In FIG. 8B, the boxes "P3", and "P4" are selected. In other words, the user wants to close the third page and the fourth page, as shown in FIG. 8B.

If the OK button 354 is clicked, the selected pages are closed. In the first alternative embodiment, the selected pages, i.e. the third page and the fourth page are closed as shown in FIG. 8C. Note that the sixth page, which is not selected in FIG. 8B, remains with the first page, the second page, and the fifth page.

In the first alternative embodiment, the user can select, i.e. confirm the pages to be closed. Note that the page selection window 352 may prompt the user to select pages to remain opened.

Figure 9A:
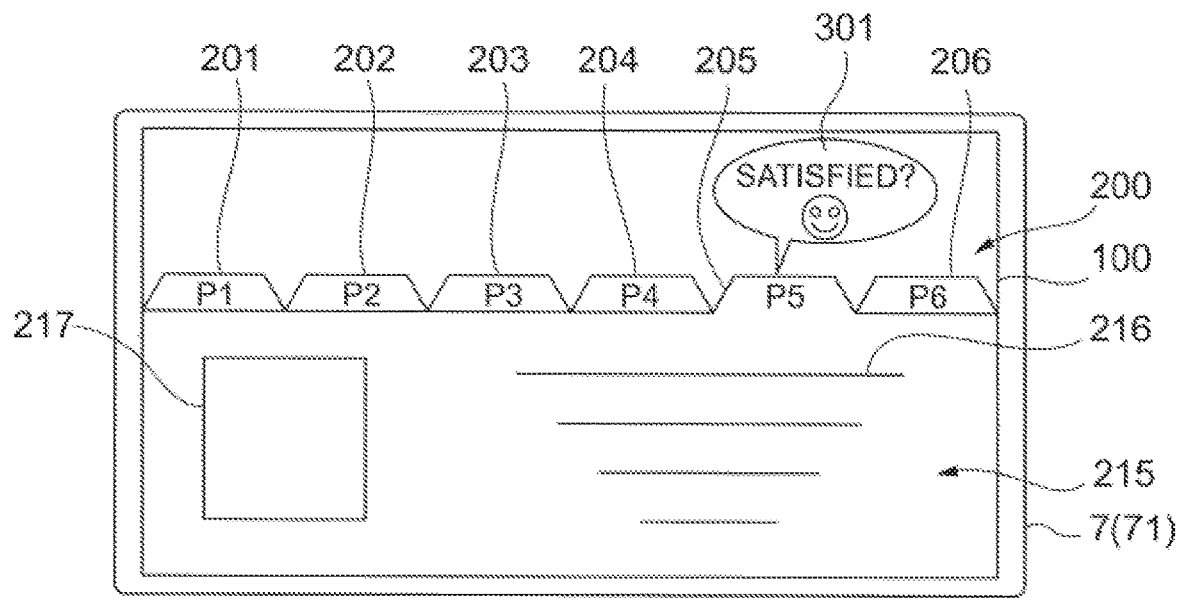
FIG. 9A depicts the application window displayed on the display according to an alternative embodiment.
Figure 9B:
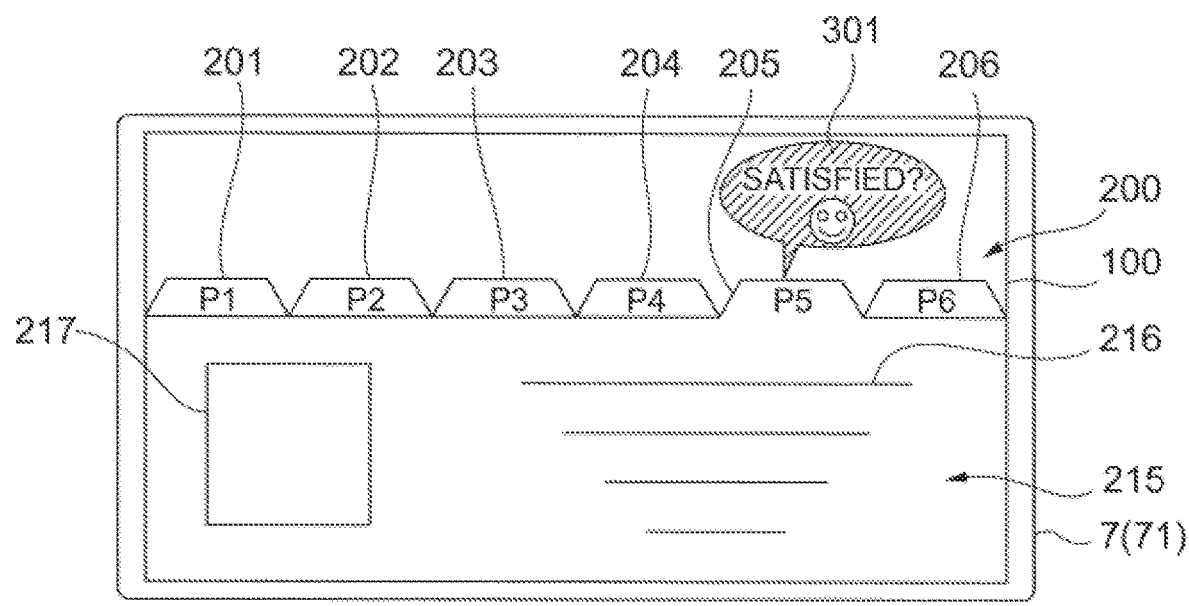
FIG. 9B depicts the application window after selecting the Satisfied button according to an alternative embodiment.
Figure 9C:
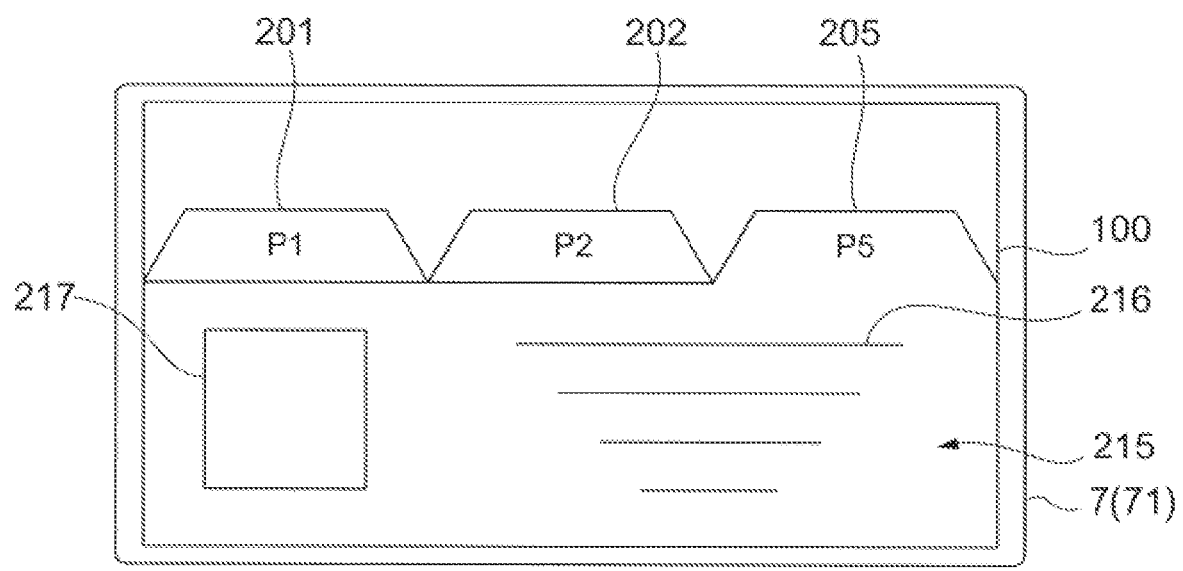
FIG. 9C depicts the application window after closing similar pages according to an alternative embodiment.

FIG. 9A depicts the application window 100 displayed on the display 7 according to a second alternative embodiment. FIG. 9B depicts the application window 100 after selecting the Satisfied button 301. FIG. 9C depicts the application window 100 after closing similar pages.

The second alternative embodiment assumes that the third page, the fourth page, and the sixth page are similar pages to the fifth page 215. In other words, the third to the sixth pages are in the same group in the similar page list.

In the second alternative embodiment shown in FIGS. 9A to 9C, the user can close the similar pages if the user clicks the Satisfied button 301. More specifically, the second alternative embodiment firstly displays the Satisfied button 301 over the fifth tab 205 as shown in FIG. 9A. If the user clicks the Satisfied button 301, the color of the Satisfied button 301 changes as shown in FIG. 9B, and the similar pages to the fifth page 215 are closed as shown in FIG. 9C.

The second alternative embodiment enables automatic restructuring of pages (i.e., tabs), by selection of the Satisfied button 301.

Figure 10A:
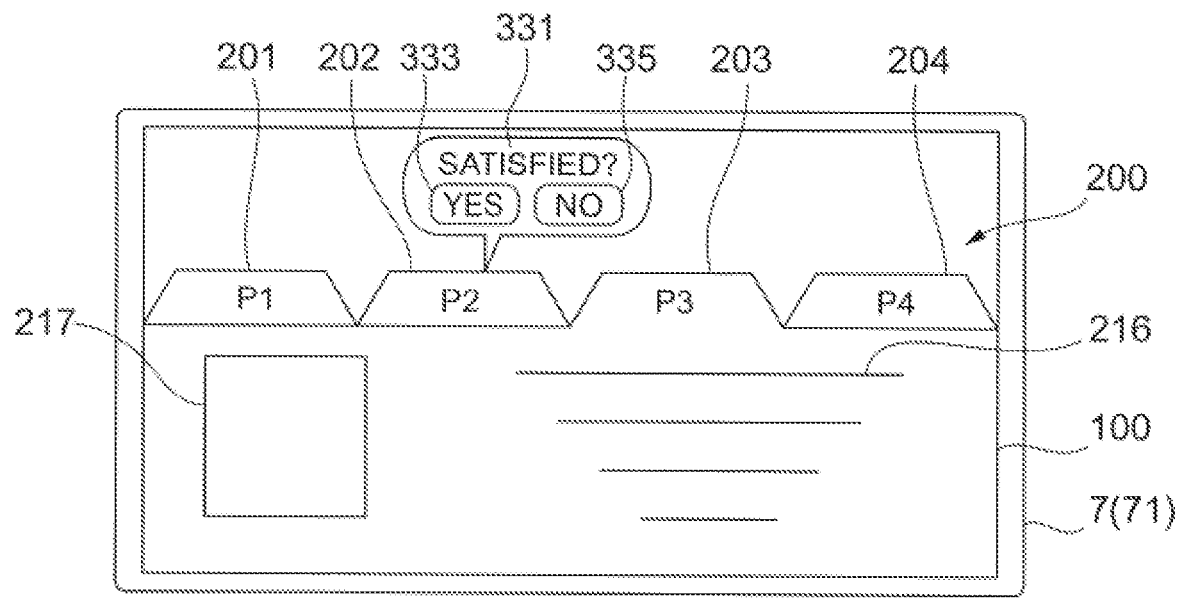
FIG. 10A depicts the application window displayed on the display according to an alternative embodiment.
Figure 10B:
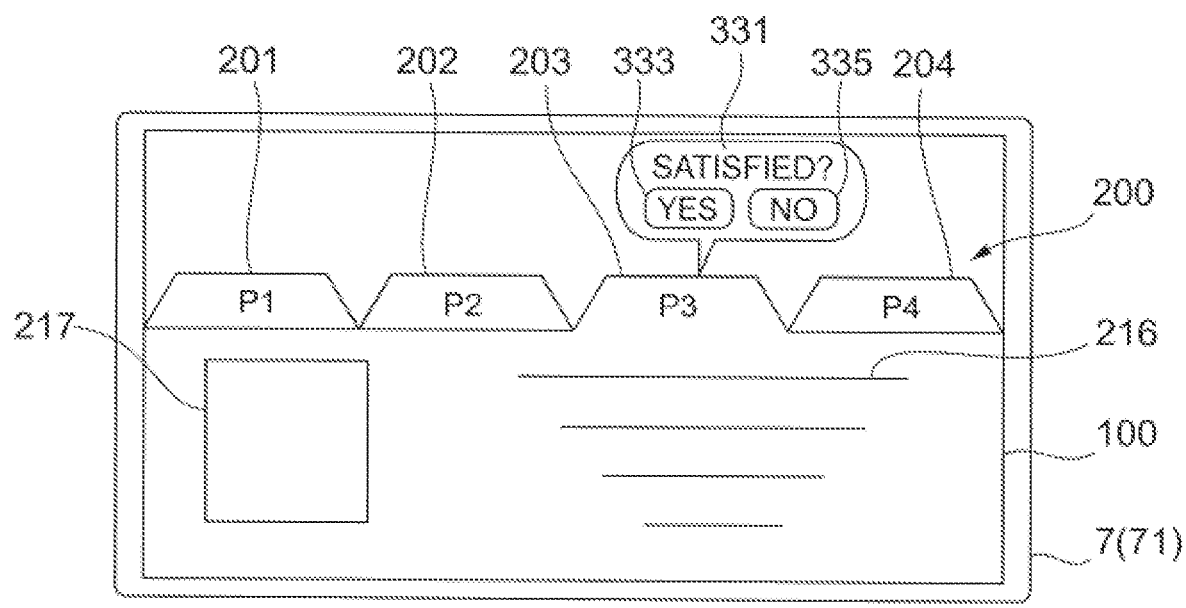
FIG. 10B depicts the application window after shifting a Satisfied button according to an alternative embodiment.
Figure 10C:
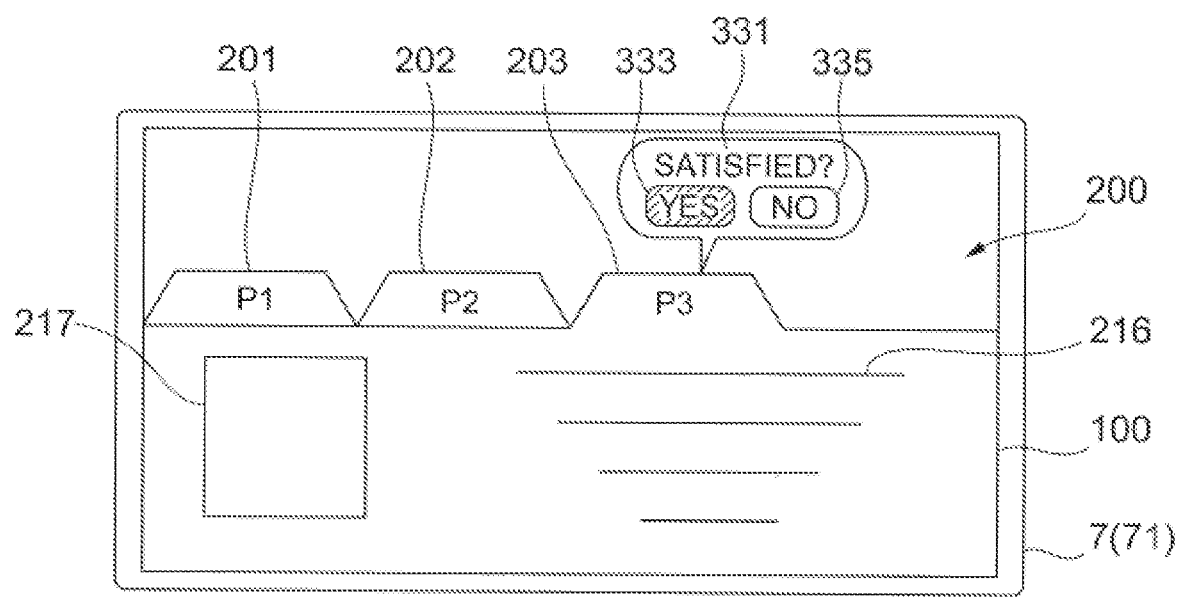
FIG. 10C depicts the application window after selecting a Yes button according to an alternative embodiment.

FIG. 10A depicts the application window 100 displayed on the display 7 according to a third alternative embodiment. FIG. 10B depicts the application window 100 after shifting a Satisfied button 331. FIG. 10C depicts the application window 100 after selecting a Yes button 304. The third alternative embodiment assumes that the second page and the third page are in the same group in the similar page list.

In the above mentioned embodiments, the Satisfied button 301 is displayed in association with a currently displayed page in the application window 100. The Satisfied button 301 may be displayed over a specific page that the user is estimated to be satisfied with. The estimation may be based on the staying time. The third alternative embodiment assumes that the degree of importance and/or usefulness of a satisfying page to the user is proportional to a length of the staying time. The staying time corresponds to the length of a viewing time of a subject page. In other words, longer staying time equates with higher usefulness of the subject page for the user.

In the third alternative embodiment, a Satisfied button 331 is displayed over a page having the longest staying time in the same group in the similar page list. Note that the Satisfied button 331 includes a Yes button 333 and a No button 335. The Yes button 333 and the No button 335 receive an input from the user.

As shown in FIG. 10A, the Satisfied button 331 is firstly displayed over the second page tabbed with the second tab 202. Note that the second page is not currently displayed but the third page is displayed in the application window 100.

If the staying time of the third page exceeds that of the second page, the Satisfied button 331 shifts to the third page as shown in FIG. 10B. In other words, the Satisfied button 331 is displayed over the third page.

If the user clicks (selects) the Yes button 333, the similar page(s) is closed as shown in FIG. 10C. In the example shown in the figure, the similar page, i.e. the fourth page is closed. Further, the Satisfied button 331 is kept displayed and the color of the Yes button 333 in the Satisfied button 331 is changed to show the current status, i.e. to show that the page currently viewed by the user satisfies the user.

Besides the example shown in FIG. 10C, if the user clicks the No button 335, the similar page(s) is not closed. The Satisfied button 331 is kept displayed and the color of the No button 335 is changed to show that the page currently viewed by the user does not satisfy the user.

Note that the Yes button 333 may be selected without the operation by the user. For example, if the staying time exceeds a predetermined time without the operation by the user, the Yes button 333 is selected assuming the user is satisfied with the page currently viewed by the user. Also, the Yes button 333 may be automatically selected based on the similarity of the opened pages.

A third alternative embodiment prevents mushrooming of tabs 200 by taking into account relevance between pieces of content of the pages and change in current importance which varies over time so as to effectively restructure the tabs 200. To achieve this, the third alternative embodiment analyzes the content of the pages and their access status, estimates the state of continued necessity and importance of the pages, and thereby proposes restructuring of the tabs 200 to the user.

Figure 11:
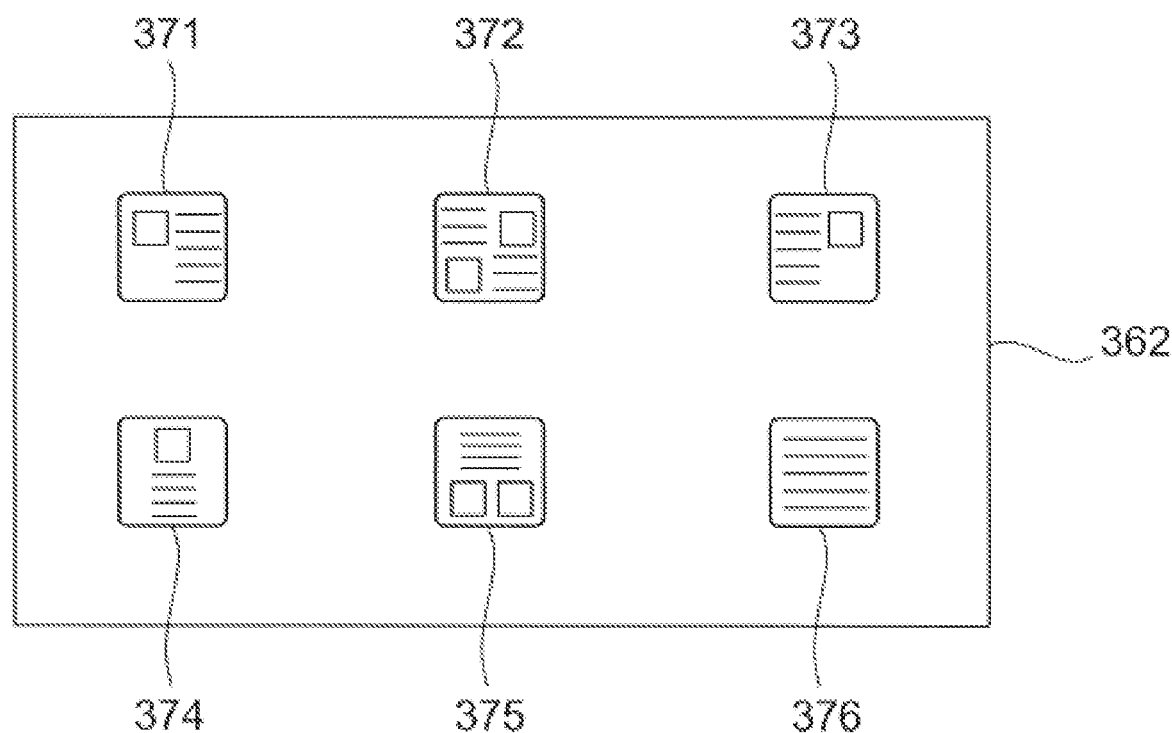
FIG. 11 depicts a page selection window according to an alternative embodiment.

FIG. 11 depicts a page selection window 362 according to the fourth alternative embodiment. The above mentioned first alternative embodiment displays the page selection window 352 to prompt the user to select pages to be closed. The page selection window 352 may include any shape of figures or text representing the pages to be closed. For example, the page selection window 362 may include thumbnails 371 to 376 of the similar pages as shown in FIG. 11. The thumbnails improve comprehensiveness of listing of the opened pages.

Here, as another alternative embodiment of the present invention, if one user clicks the Satisfied button 301 regarding a specific page, information on the specific page can be shared by other users. Note that if the one user is satisfied with the specific page, the same page may satisfy other users. For example, URLs of the specific page may be stored in a server accessible by other users. Further, the information on the specific page may be selectively stored in the server depending on an attribute (property) of the user. For example, examples of the attribute of the user may be a skill level of the user, and an area (e.g., of expertise, etc.) the user belongs to.

The Satisfied button 30 may be any icon or figure displayed in the presentation space 71. For example, the Satisfied button 30 may be an application launcher.

The Satisfied button 301 may be any shape. For example, the Satisfied button 301 may be a rectangular button or a circular button. Further, the location of the Satisfied button 301 may be any position. For example, the Satisfied button 301 may be displayed inside of the tab. The Satisfied button 301 may also be displayed near the tab showing a relationship with the tab. For example, the Satisfied button 301 and the tab may be connected with a line.

The Satisfied button 301 may be displayed if a predetermined condition is met. For example, the Satisfied button 301 may be displayed if a new page has content similar to one of the opened pages. In this example, the Satisfied button 301 is not displayed if the new page does not have content similar to any one of the opened pages. As another example, the Satisfied button 301 may be displayed if a total number of the new page and the opened pages exceeds a predetermined number.

In the above mentioned embodiments, the confirmation window 302 is displayed if the user clicks the Satisfied button 301. A trigger to display the confirmation window 302 is not limited to this. Here, the detection unit 60 may detect that the Satisfied button 301 is focused by the user. For example, the detection unit 60 detects that the user hovers a pointer over the Satisfied button 301. The confirmation window 302 may be displayed if the Satisfied button 301 is focused.

Note that other operations may be conducted if the user clicks the Satisfied button 301. Examples of the other operations are to delete an access history of URLs of the similar pages, or to replace bookmarks of the similar pages with the satisfying page. Another example of the other operations is to store link information, i.e. mapping information, from the similar pages to the satisfying page. The link information enables redirection of the user to the satisfying page when the user tries to access one of the similar pages.

In the above mentioned embodiments, the similar pages are closed in response to clicking the Satisfied button 301. A trigger to close the similar pages is not limited to this. For example, the trigger to close the similar pages may be the timing of closing one page in the same group in the similar page list. More specifically, the similar pages may be closed in response to closing the satisfying page. Also, one page of the similar pages may be closed in response to closing another page of the similar pages.

In the new page process of the exemplary embodiment shown in FIG. 5, the open unit 51 of the restructuring unit 50 adds the new tab (step 502). Note that if the new page is opened using a blank page being currently displayed in the application window 100, the open unit 51 of the restructuring unit 50 displays the new page without adding the new tab in step 502.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the present invention has been disclosed by way of example for purposes of illustration, and not limitation.

What is claimed is:

1. A computer-implemented method comprising:
   selecting a web page from a plurality of web pages being opened in a web browser, the selected web page including a web page tab corresponding to the selected web page in the web browser;
   in response to the selected web page in the web browser, finding each similar page having similar content to the selected web page from the plurality of web pages;
   determining a location adjacent the web page tab corresponding to the selected web page;
   automatically displaying a user interface component at the determined location adjacent the web page tab corresponding to the selected web page to initiate a process to close at least one similar page, responsive to finding the similar page having similar content to the selected webpage, the automatically displayed user interface component including information for prompting a user to indicate a user satisfaction with the selected web page relative to the at least one similar page having similar content to the selected web page;
   in response to detecting, via the automatically displayed user interface component, an operation by the user indicating the user satisfaction associated with the selected web page, displaying a page selection window including a listing of each similar page having similar content to the selected web page, the displayed page selection window prompting the user to select the at least one similar page from the listing of each similar page; and
   in response to detecting, via the displayed page selection window, a selection of the at least one similar page from the listing of each similar page, closing the at least one similar page having similar content to the selected web page, hiding the automatically displayed user interface component at the determined location adjacent the web page tab corresponding to the selected web page, and hiding the displayed confirmation window.

2. The computer-implemented method according to claim 1, wherein the selected web page is a web page being newly opened.

3. The computer-implemented method according to claim 1, further comprising:
   closing the similar page while leaving the selected web page open in response to the detected operation on the automatically displayed user interface component by the user.

4. The computer-implemented method according to claim 1, wherein a dissimilar page is left open after the detected operation by the user, the dissimilar page being one of the plurality of web pages, the dissimilar page having less similar content to the selected web page than the similar page.

5. The computer-implemented method according to claim 1, wherein link information from the similar page to the selected web page is stored in response to the detected operation by the user, the link information redirecting the user to the selected web page if the user tries to access the similar page.

6. A computer program product comprising:
   one or more non-transitory computer-readable storage devices and program instructions stored on at least one of the one or more computer-readable storage devices for execution by at least one or more computer processors of a computer system, the program instructions, when executed by the at least one of the one or more computer processors, causing the computer system to perform a method comprising:
   selecting a web page from a plurality of web pages being opened in a web browser, the selected web page including a web page tab corresponding to the selected web page in the web browser;
   in response to the selected web page in the web browser, finding each similar page having similar content to the selected web page from the plurality of web pages;
   determining a location adjacent the web page tab corresponding to the selected web page;
   automatically displaying a user interface component at the determined location adjacent the web page tab corresponding to the selected web page to initiate a process to close at least one similar page, responsive to finding the similar page having similar content to the selected webpage, the automatically displayed user interface component including information for prompting a user to indicate a user satisfaction with the selected web page relative to the at least one similar page having similar content to the selected web page;
   in response to detecting, via the automatically displayed user interface component, an operation by the user indicating the user satisfaction associated with the selected web page, displaying a page selection window including a listing of each similar page having similar content to the selected web page, the displayed page selection window prompting the user to select the at least one similar page from the listing of each similar page; and
   in response to detecting, via the displayed page selection window, a selection of the at least one similar page from the listing of each similar page, closing the at least one similar page having similar content to the selected web page, hiding the automatically displayed user interface component at the determined location adjacent the web page tab corresponding to the selected web page, and hiding the displayed confirmation window.

7. The computer program product according to claim 6, wherein the selected web page is a web page being newly opened.

8. The computer program product according to claim 6, further comprising:
   closing the similar page while leaving the selected web page open in response to the detected operation on the automatically displayed user interface component by the user.

9. The computer program product according to claim 6, wherein a dissimilar page is left open after the detected operation by the user, the dissimilar page being one of the plurality of web pages, the dissimilar page having less similar content to the selected web page than the similar page.

10. The computer program product according to claim 6, wherein link information from the similar page to the selected web page is stored in response to the detected operation by the user, the link information redirecting the user to the selected web page if the user tries to access the similar page.

11. A computer system comprising:
one or more computer processors, one or more non-transitory computer-readable storage media, and program instructions stored on one or more of the computer-readable storage media for execution by at least one of the one or more computer processors, the program instructions, when executed by the at least one of the one or more computer processors, causing the computer system to perform a method comprising:
selecting a web page from a plurality of web pages being opened in a web browser, the selected web page including a web page tab corresponding to the selected web page in the web browser;
in response to the selected web page in the web browser, finding each similar page having similar content to the selected web page from the plurality of web pages;
determining a location adjacent the web page tab corresponding to the selected web page;
automatically displaying a user interface component at the determined location adjacent the web page tab corresponding to the selected web page to initiate a process to close at least one similar page, responsive to finding the similar page having similar content to the selected webpage, the automatically displayed user interface component including information for prompting a user to indicate a user satisfaction with the selected web page relative to the at least one similar page having similar content to the selected web page;
in response to detecting, via the automatically displayed user interface component, an operation by the user indicating the user satisfaction associated with the selected web page, displaying a page selection window including a listing of each similar page having similar content to the selected web page, the displayed page selection window prompting the user to select the at least one similar page from the listing of each similar page; and
in response to detecting, via the displayed page selection window, a selection of the at least one similar page from the listing of each similar page, closing the at least one similar page having similar content to the selected web page, hiding the automatically displayed user interface component at the determined location adjacent the web page tab corresponding to the selected web page, and hiding the displayed confirmation window.

12. The computer system according to claim 11, wherein the selected web page is a web page being newly opened.

13. The computer system according to claim 11, further comprising:
closing the similar page while leaving the selected web page open in response to the detected operation on the automatically displayed user interface component by the user.

14. The computer system according to claim 11, wherein a dissimilar page is left open after the detected operation by the user, the dissimilar page being one of the plurality of web pages, the dissimilar page having less similar content to the selected web page than the similar page.

15. The computer system according to claim 11, wherein link information from the similar page to the selected web page is stored in response to the detected operation by the user, the link information redirecting the user to the selected web page if the user tries to access the similar page.

\* \* \* \* \*